(12) United States Patent
Combes et al.

(10) Patent No.: US 8,561,941 B2
(45) Date of Patent: Oct. 22, 2013

(54) PIN SYSTEM FOR THE CONNECTION ASSEMBLY OF AN ENGINE PYLON UNDERNEATH A WING OF AN AIRCRAFT

(75) Inventors: Stephane Combes, Buzet sur Tarn (FR); Pascal Gardes, Lherm (FR)

(73) Assignee: Airbus Operations S.A.S., Toulouse (FR)

( * ) Notice: Subject to any disclaimer, the term of this patent is extended or adjusted under 35 U.S.C. 154(b) by 430 days.

(21) Appl. No.: 13/078,593

(22) Filed: Apr. 1, 2011

(65) Prior Publication Data

US 2011/0266389 A1 Nov. 3, 2011

(30) Foreign Application Priority Data

Apr. 2, 2010 (FR) ...................................... 10 52537

(51) Int. Cl.
B64D 27/00 (2006.01)
(52) U.S. Cl.
USPC .......................................... 244/54; 248/554
(58) Field of Classification Search
USPC ................ 244/54; 248/554, 555; 60/796, 797
See application file for complete search history.

(56) References Cited

U.S. PATENT DOCUMENTS

| | | | |
|---|---|---|---|
| 2,402,693 A | 6/1946 | Summerbell | |
| 3,831,888 A | 8/1974 | Baker et al. | |
| 4,943,013 A * | 7/1990 | Kapala et al. | 244/54 |
| 7,121,504 B2 * | 10/2006 | Machado et al. | 244/54 |
| 7,891,604 B2 | 2/2011 | Combes et al. | |
| 7,950,604 B2 | 5/2011 | Combes et al. | |
| 2005/0151008 A1 | 7/2005 | Machado et al. | |
| 2008/0197233 A1 * | 8/2008 | Combes et al. | 244/54 |
| 2009/0108127 A1 * | 4/2009 | Cazals | 244/54 |
| 2009/0200419 A1 * | 8/2009 | Levert et al. | 244/54 |
| 2010/0090056 A1 | 4/2010 | Gardes et al. | |
| 2010/0116926 A1 | 5/2010 | Combes et al. | |
| 2010/0127117 A1 | 5/2010 | Combes et al. | |
| 2010/0127118 A1 | 5/2010 | Combes et al. | |
| 2010/0133376 A1 | 6/2010 | Foyer et al. | |
| 2010/0147997 A1 * | 6/2010 | Martinou et al. | 244/54 |
| 2010/0181417 A1 | 7/2010 | Combes et al. | |
| 2010/0181419 A1 * | 7/2010 | Haramburu et al. | 244/54 |

FOREIGN PATENT DOCUMENTS

EP 1 535 837 A1 6/2005
FR 2 915 178 A1 10/2008

OTHER PUBLICATIONS

French Preliminary Search Report and Written Opinion issued Nov. 16, 2010, in French 1052537, filed Apr. 2, 2010 (with English Translation of Categories of Cited Documents).

* cited by examiner

Primary Examiner — Christopher P Ellis
(74) Attorney, Agent, or Firm — Oblon, Spivak, McClelland, Maier & Neustadt, L.L.P.

(57) ABSTRACT

A connection assembly of an engine pylon underneath an aircraft wing, the wing being provided with a fitting, the engine pylon being provided with a fork joint nested in the fitting and fixed to the said fitting by means of a traversing pin system, including: an external primary pin, a secondary pin mounted inside the primary pin, a primary shoulder mounted directly around the primary pin, at a blind end of the pin system, to block the said pin in translation, a secondary shoulder mounted around one end of the secondary pin, at a blind end of the pin system, to block the system in rotation, and an interlocking assembly mounted around the primary pin and the secondary pin, at a free end of the pin system, to block the pin system in translation.

10 Claims, 7 Drawing Sheets

————— Emergency path
– – – – – – Primary path

PIN SYSTEM FOR THE CONNECTION ASSEMBLY OF AN ENGINE PYLON UNDERNEATH A WING OF AN AIRCRAFT

FIELD OF THE INVENTION

The invention relates to a pin system intended for a connection assembly of an engine pylori underneath an aircraft wing. This pin system requires only a single maneuvering space and an access space for its installation.

The invention has applications in the field of aeronautics and in particular in the field of secure connections between an engine pylori and a wing.

PRIOR ART

Figure 1:
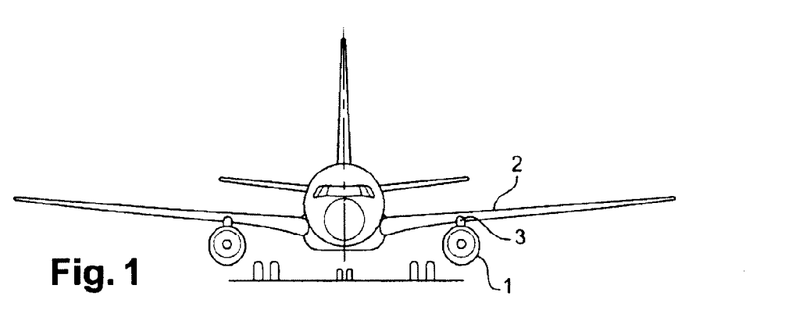
FIG. 1, already described, shows an aircraft with a wing and an engine fixed underneath the wing by way of an engine pylori.

In most aircraft, the engine is fixed underneath the aircraft wing by means of a structure known as an engine pylori. An example of an aircraft having an engine 1 mounted underneath wing 2 is shown in FIG. 1. As in the majority of aircraft, wing 2 is provided with a fitting, in the interior of which there is nested a fork joint of engine pylori 3. Traditionally, the fork joint of pylori 3 is fixed in the fitting of wing 2 by means of a pin system installed by sliding. In the majority of aircraft, when the pin system is installed through the fitting and the fork joint, these are maintained in assembled condition by providing an interlock of the system to prevent any risk of sliding of the said pin system during flight of the aircraft. This interlock is achieved by means of nuts positioned and tightened on both sides of the pin system to block the said system in the interior of the fitting and of the fork joint.

For safety reasons, all the structural elements indispensable to the aircraft are usually doubled in an aircraft. Thus all the paths for passage of forces in a structure are redundant, in order to assure the integrity of the structure if one of the elements for passage of forces were to break. In particular, in the connection assemblies between engine pylori and wing, a double pin system is usually used to assure transmission of forces by the second pin, if the primary pin is faulty. For these reasons, a traditional pin system is provided with an external primary pin and an internal secondary pin mounted inside the primary pin. The primary pin and the secondary pin are concentric. In such a traditional pin system, a rod is placed at the center of the pin system, traversing the secondary pin from end to end. This rod is equipped at each of its ends with a thread on which a nut is installed. Each of these nuts must be tightened to ensure interlocking of the pin system.

Figure 2:
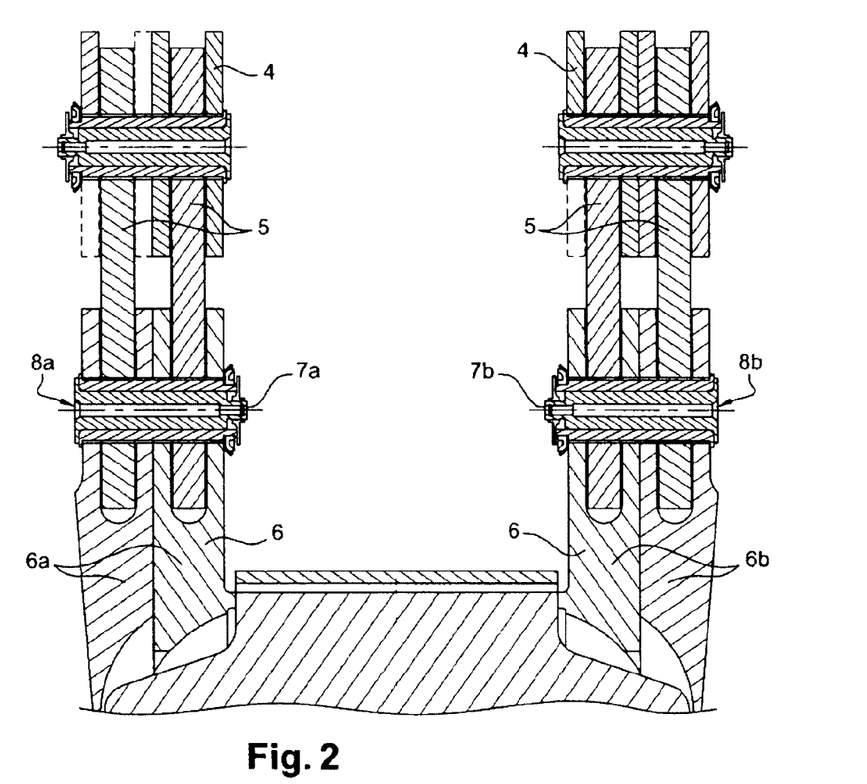
FIG. 2, already described, shows an example of a traditional connection assembly in which the two faces of the fitting are accessible.

An example of the traditional assembly of a fork joint 5 of an engine pylori and of a wing fitting 6 has been shown in FIG. 2. In this example, as in numerous aircraft, the engine pylori is provided with a pyramid arm 4 installed between two parts 6a, 6b of wing fitting 6. In general, the two parts 6a, 6b of fitting 6 are spaced relatively far apart from one another. The maneuvering space between the two parts of the fitting is then sufficiently large to permit an operator to pass a tool, such as a plain or torque wrench, in order to tighten interlocking nuts 7a, 7b of the respective pin systems 8a, 8b.

Figure 3A:
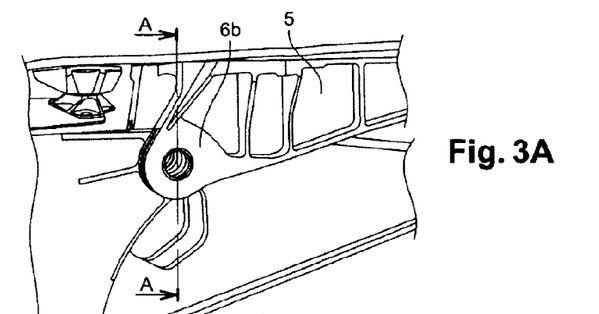
FIGS. 3A and 3B show an example of a connection assembly in which the space for access to one of the faces of the fitting is too small to permit a tool to be maneuvered.
Figure 3B:
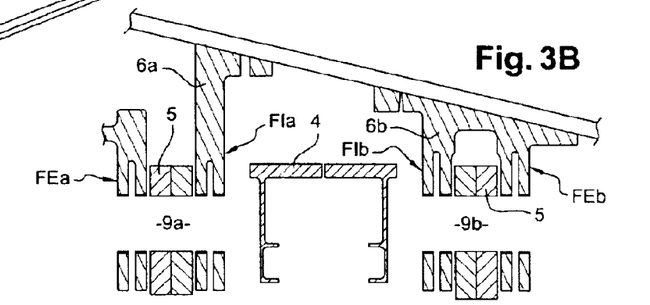

In certain aircraft, however, the structure of the connection assembly is such that pyramid arm 4 is situated between two pin systems. An example of such a structure is illustrated in FIGS. 3A and 3B. In these figures, pyramid arm 4 is seen positioned between the locations 9a, 9b, each of which is reserved for a pin system. This figure shows that the space between pyramid arm 4 of the pylori and the two parts 6a, 6b of fitting 6 is relatively narrow and consequently difficult for an operator to access. It is therefore impossible, for an operator equipped with a plain or torque wrench, to tighten nuts situated at the inner end of the pin system, or in other words on the face of the pin system situated facing pyramid arm 4. The lack of accessibility of this structure therefore prevents interlocking of a traditional pin system.

EXPLANATION OF THE INVENTION

The invention has precisely the object of remedying the disadvantages of the techniques described in the foregoing. For this purpose, the invention proposes a connection assembly of an engine pylori underneath an aircraft wing, wherein a single maneuvering space is sufficient to interlock a traversing pin system there, a passage space being sufficient at an opposite end to slip on a lock washer. The pin system of the invention is of semi-blind type: it is inserted from one side of the fitting and interlocked from this same side.

For that purpose, the pin system of the invention is provided with shoulders mounted simply, without tools, at the blind ends of the pins to assure that the said pins and the interlocking means mounted using tools around the free ends of the pins are maintained in position.

More precisely, the invention relates to a connection assembly of an engine pylori underneath an aircraft wing, the wing being provided with a fitting, the engine pylori being provided with a fork joint nested in the fitting and fixed to the said fitting by means of a traversing pin system. This connection assembly is characterized by the fact that the pin system is provided with:
- an external primary pin,
- a secondary pin mounted inside the primary pin,
- a primary shoulder mounted directly around the primary pin, at a blind end of the pin system, to block the said pin in translation,
- a secondary shoulder mounted around one end of the secondary pin, at a blind end of the pin system, to block the system in rotation,
- an interlocking assembly mounted around the primary pin and the secondary pin, at a free end of the pin system, to block the pin system in translation.

The connection assembly of the invention may be provided with one or more of the following characteristics:
- the primary shoulder has a flattened annular shape with a central orifice and an external flange capable of being inserted at least partly into a groove of the primary pin,
- the secondary shoulder has a form of a disk equipped with an off-centered oblong lateral opening capable of being inserted around the blind end of the secondary pin,
- the primary shoulder has a form of a washer with a central orifice and at least one polarizing element, to assure that the shoulder is maintained in a groove of the primary pin,
- the secondary shoulder has a form of a disk equipped with a central opening, whose shape is complementary to that of a blind face of the secondary pin,
- the secondary pin is provided with a groove capable of receiving the secondary shoulder,
- the secondary shoulder is provided with a longitudinal flange covering the external flange of the primary shoulder at least partly,
- the blind end of the secondary pin is provided with at least one flat portion capable of coming into contact against a flat portion of the primary shoulder and/or a flat portion of the primary pin,
- the interlocking assembly is provided with a primary nut screwed around a free end of the secondary pin and a secondary nut mounted around this same one free end of the secondary pin, the primary nut is provided with an annular part equipped with a screw thread and a collar flange partly covering the free end of the primary pin.

The invention also relates to a method for installing a connection assembly such as described in the foregoing. This method is characterized by the fact that it includes the following operations:

installation of the fork joint of the pylori in the wing fitting,
sliding of the primary pin through the fork joint and the fitting from a free face of the fitting as far as a blind face of the said fitting,
installation of the primary shoulder around the blind end of the primary pin,
sliding of the secondary pin inside the primary pin,
installation of the secondary shoulder around the blind end of the secondary pin,
screwing of the primary nut around the free end of the secondary pin, and
installation of the secondary nut around the free end of the secondary pin.

The invention also relates to an aircraft equipped with an engine pylori and with a wing underneath which the engine pylori is fixed. A pin system assures the connection between the engine pylori and the wing. This pin system conforms with the foregoing description.

DETAILED DESCRIPTION OF EMBODIMENTS OF THE INVENTION

The invention relates to a traversing pin system that can be installed in a connection assembly having a restricted space between the two parts of the fitting. This pin system is a semi-blind system, which can be installed from a single maneuvering face of the fitting, a passage space being sufficient along the other face to permit interlocking of the system.

Throughout the description hereinafter, reference will be made to the external face and the internal face of the fitting, the external face being the maneuvering face from which the operator is able to install the system and maneuver his tools, and the internal face being the face situated facing the pyramid arm of the engine pylori and offering a reduced space through which simply the operator's hand can be passed. The internal face is also referred to as the blind face. The external face is also referred to as the free face.

In the example of FIGS. 3A and 3B, a first pin system according to the invention is installed in location $9a$ from the external face FEa of fitting $6a$ and a second pin system is placed in location $9b$ from external face FEb of fitting $6b$. The first pin system is interlocked in its location $9a$ at internal face FIa of fitting $6a$; the second pin system is interlocked in its location $9b$ at internal face FIb of fitting $6b$. The pin system according to the invention is placed by sliding in fitting 6 from external face FE of the fitting toward internal face FI of the said fitting and by installation of shoulders in the access space between pyramid arm 4 and internal face FI. Once in place, the pin system is interlocked in the fitting solely from its side situated on the external face FE.

Figure 4:
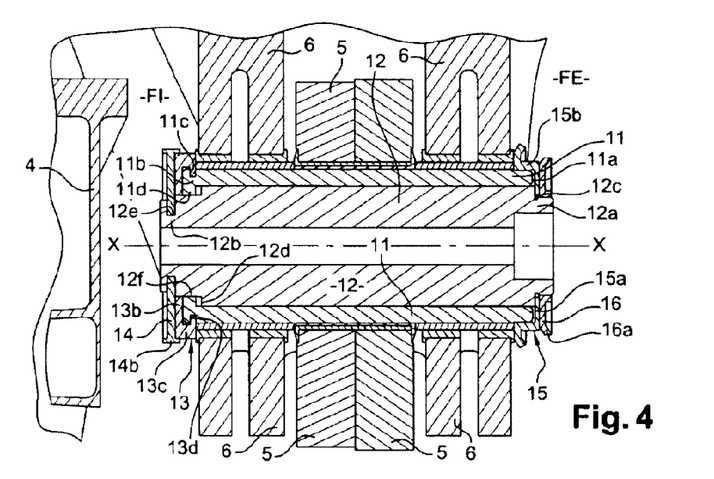
FIG. 4 shows a view in section of a pin system according to the invention.

An example of the pin system of the invention is shown in FIG. 4, in a view in section. This pin system is provided with a primary pin 11 and a secondary pin 12, which are concentric and substantially identical to the primary and secondary pins of the traditional system described in the foregoing, except at their ends.

Free end $11a$ of the primary pin, or in other words its end situated on the external face FE of the fitting, is straight. In contrast, its blind end $11b$, situated on the internal face FI of the fitting, is provided on its external face situated facing the fitting with a radial groove $11c$, intended to receive a flange of primary shoulder 13 described hereinafter. Blind end $11b$ of primary pin 11 is additionally provided, on its internal face in contact with secondary pin 12, with a radial overhang $11d$ intended to assure a stop for the secondary pin against the primary pin.

Secondary pin 12 is provided at its free end $12a$ with a first undercut relief $12c$ permitting insertion of primary nut 15 described hereinafter. It is provided at its blind end $12b$ with a second undercut relief $12d$ forming, together with overhang $11d$ of the primary pin, an assembly of mortise-and-tenon type that assures nesting of the secondary pin in the primary pin while it is being placed. Blind end $12b$ of the secondary pin is additionally provided with a radial groove $12e$ intended to receive secondary shoulder 14, which will be described hereinafter.

The pin system of the invention is additionally provided with a stopper assembly composed of two shoulders 13 and 14, interleaved one in the other. Primary shoulder 13 assures blocking of primary pin 11 in translation. Secondary shoulder 14 assures blocking of secondary pin 12 in translation.

For that purpose, primary shoulder 13 has the shape of a washer of diameter adapted to the external diameter of primary pin 11. More precisely, primary shoulder 13 has a flattened annular shape with a central orifice $13a$. The diameter of this central orifice is identical to the inside diameter of the primary pin at its blind end $11b$. In addition, the outside diameter of primary shoulder 13 is substantially identical to the outside diameter of primary pin 11 at its blind end.

Primary shoulder 13 has a shape of a cap provided with:
a disk $13b$, whose surface corresponds substantially to the thickness of the primary pin,
an external flange $13d$ with a back-projection $13c$ capable of being inserted in groove $11c$ of the primary pin.

Groove $11c$ of primary pin 11 and flange $13d$ of primary shoulder 13 are each provided with a system of fixation by rotation, complementary to one another and making it possible to interlock primary shoulder 13 around primary pin 11. This system of fixation by rotation may be, for example, a screw thread or a bayonet-lock system.

Primary shoulder 13 with its flange 13d has a dimension sufficient to constitute a stop capable of blocking the entire pin system in translation relative to the fitting, from the blind end toward the free end of the said fitting.

The central orifice of primary shoulder 13 is equipped on its circumference with at least one flat portion 13e. Similarly, the blind end of secondary pin 12 is provided with at least one flat portion 12f on undercut relief 12d. Flat portion 12f of the secondary pin is intended to come into contact against flat portion 13e of primary shoulder 13 in order to assure blocking in rotation of the secondary pin with the shoulder, in turn inducing blocking in rotation of stopper assembly 13, 14 with the primary and secondary pins.

Secondary shoulder 14 has a shape of a disk equipped with an oblong lateral opening 14a. This oblong opening 14a is off-centered in disk 14: it begins from the center of the disk and extends over the entire radius of the disk, such that the shoulder is C-shaped. This oblong opening 14a permits insertion of shoulder 14 around blind end 12b of secondary pin 12.

The width of this oblong orifice 14a is adapted to the width of the secondary pin at the location of groove 12e. More precisely, the width of oblong opening 14a is substantially greater than the thickness of the secondary pin in groove 12e.

As will be seen hereinafter, secondary shoulder 14 is provided to be slipped into groove 12e of secondary pin 12, along the primary shoulder. Secondary shoulder 14 may be provided with a longitudinal overhang 14b, whose shape may be opposite that of flange 13d of primary shoulder 13 in order to interlock secondary shoulder 14 on primary shoulder 13, so that it does not come out during flight.

The installation of these shoulders 13 and 14 is shown in FIGS. 5A to 5F.

Different steps of installation of the primary and secondary shoulders according to a second embodiment of the invention have been shown in FIGS. 8A to 8H.

Figures 8A, 8B, 8C, 8D, 8E, 8F, 8G, 8H:
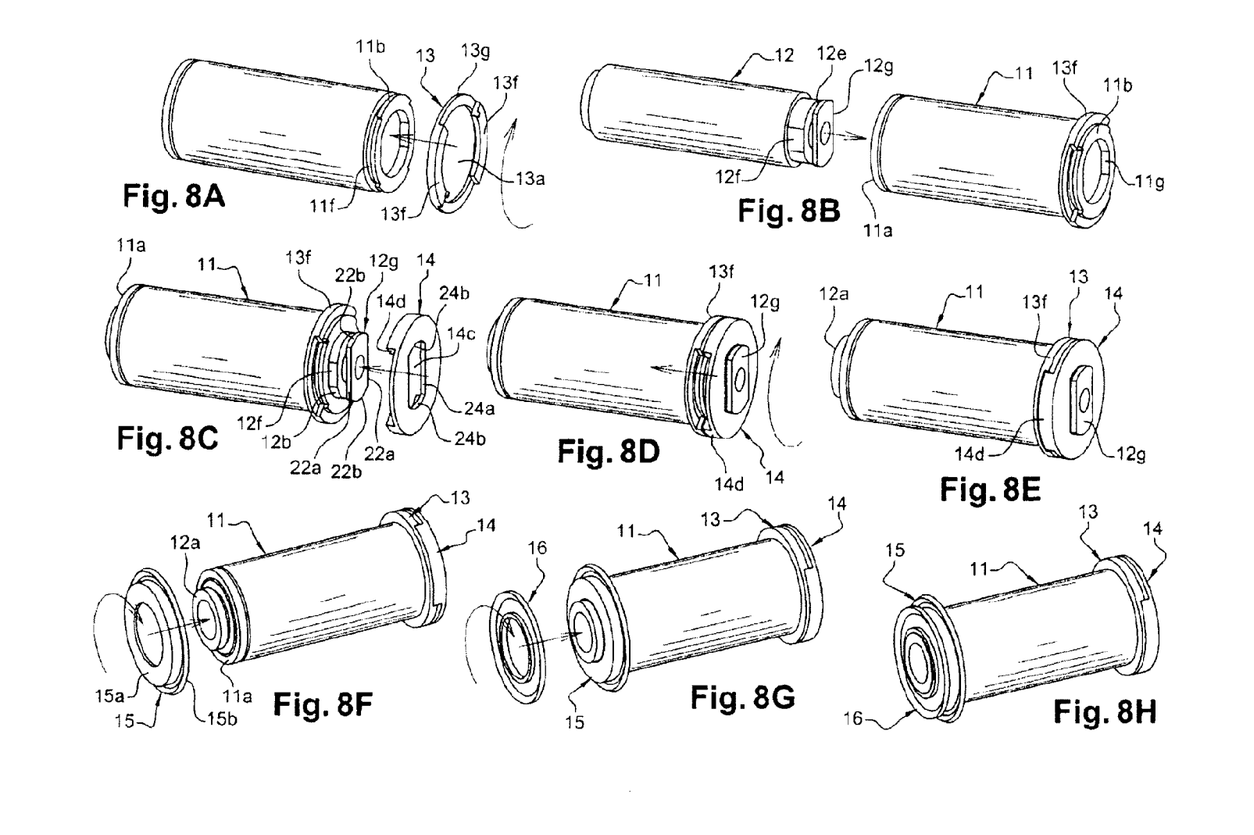
FIGS. 8A to 8H show different steps of assembly of the pin system according to a second embodiment of the invention.

In this second embodiment, primary shoulder 13 has the shape of a washer of diameter adapted to the outside diameter of primary pin 11. More precisely, primary shoulder 13 has a flattened annular shape with a central orifice 13a. The diameter of this central orifice 13a is identical to the diameter of groove 11c of the primary pin. Primary shoulder 13 is provided with:

- a ring 13g, whose surface corresponds substantially to the thickness of the primary pin and whose orifice has a size adapted to be inserted into groove 11c of the primary pin,
- at least one polarizing element 13f (for example, two in the example of FIG. 8) formed by a partial ring mounted on top of ring 13g and having a surface substantially larger than that of ring 13g, so that, at the location of the partial ring, the diameter of central orifice 13a is substantially narrower than that of groove 11c.

End 11b of the primary pin is provided with notches 11f that offer the primary pin an outside diameter identical to that of groove 11c at the location of these notches. In this way, primary shoulder 13 is mounted around the primary pin by making polarizing elements 13f coincide with notches 11f. When primary shoulder 13 is in place around primary pin 11, a rotation, for example of 90°, makes it possible to lock it around the said pin, polarizing elements 13f assuring that shoulder 13 is maintained in place in groove 11c.

Primary shoulder 13 has a dimension sufficient to constitute a stop capable of blocking the entire pin system in translation relative to the fitting, from the blind end toward the free end of the said fitting.

In this embodiment, the blind end of secondary pin 12 is provided with at least one flat portion 12f on undercut relief 12d. Flat portion 12f of the secondary pin is intended to come into contact against flattened portion 11g made in the internal wall of primary pin 11, at its blind end 11b, in order to assure blocking in rotation of stopper assembly 13, 14 with the primary and secondary pins.

In addition, blind end 12b of secondary pin 12 is provided with a blind face 12g of non-circular shape, intended to be inserted in a secondary shoulder 14 described hereinafter. The shape of blind face 12g may be, for example, oval or oblong, as shown in FIGS. 8B and 8C, provided with two straight parallel sides 22a connected by two curved sides 22b.

In this embodiment, secondary shoulder 14 has the shape of a disk equipped with a central opening 14c. This central opening 14c has a shape complementary to that of blind face 12g of secondary pin 12. In the example of FIGS. 8A to 8H, this central opening 14c has an oblong shape whose contour has a dimension adapted to be nested around blind face 12g of the secondary pin.

This central opening 14c permits insertion of shoulder 14 around blind end 12b of secondary pin 12.

Secondary shoulder 14 is additionally provided with at least one longitudinal partial flange 14d, whose shape and height are complementary to the zones of ring 13g situated between polarizing elements 13f of primary shoulder 13. Preferably it is provided with two longitudinal partial flanges 14d facing one another.

Thus, when secondary pin 12 is inserted into primary pin 11 with flat portions 12f and 11g, which coincide, blind end 12b of the primary pin extends outside primary pin 11. Secondary shoulder 14 can then be mounted around this blind end 12b so that its central orifice 14c is nested around blind face 12g of the secondary pin. Longitudinal partial flanges 14d are then positioned facing polarizing elements 13f of primary shoulder 13, as shown in FIG. 8D.

To position secondary shoulder 14 definitively, it is subjected to a rotation, for example by 90°, so that longitudinal partial flanges 14d of secondary shoulder 14 become nested between polarizing elements 13f of primary shoulder 13, thus interlocking secondary shoulder 14 on primary shoulder 13. This rotation of secondary shoulder 14 brings about the displacement of secondary pin 12 inside primary pin 11, from the blind face toward the free face, as shown in FIG. 8E. Free face 12a of the secondary pin then extends outside primary pin 11.

Regardless of the embodiment, free end 12a of the secondary pin is then capable of receiving an interlocking assembly 15, 16. This interlocking assembly 15, 16 is therefore installed at end 12a of the secondary pin, or in other words at the end situated on the external face FE of the fitting, to assure blocking of the system in translation from the external face FE toward the internal face FI of the fitting.

This interlocking assembly is provided with a primary nut 15 screwed around the free end of secondary pin 12 and a secondary nut 16, also screwed around the free end of secondary pin 12.

Primary nut 15 has a traditional shape of a threaded nut with:

- an annular part 15a of dimension sufficient to cover end 11a of the primary pin and equipped on its internal circumference with a screw thread capable of being screwed around free end 11a of the primary pin, and
- a collar flange 15b, partly covering free end 11a of the primary pin and forming a stop capable of blocking the entire pin system in translation relative to the fitting, from the free end toward the blind end of the said fitting.

Secondary nut 16 has a shape of a crown equipped on its internal circumference with a screw thread capable of being screwed around the free end of secondary pin 12. The secondary nut may be provided with a curved flange 16a capable of receiving another aeronautic element such as a braking system.

Figures 5A, 5B, 5C, 5D, 5E, 5F:
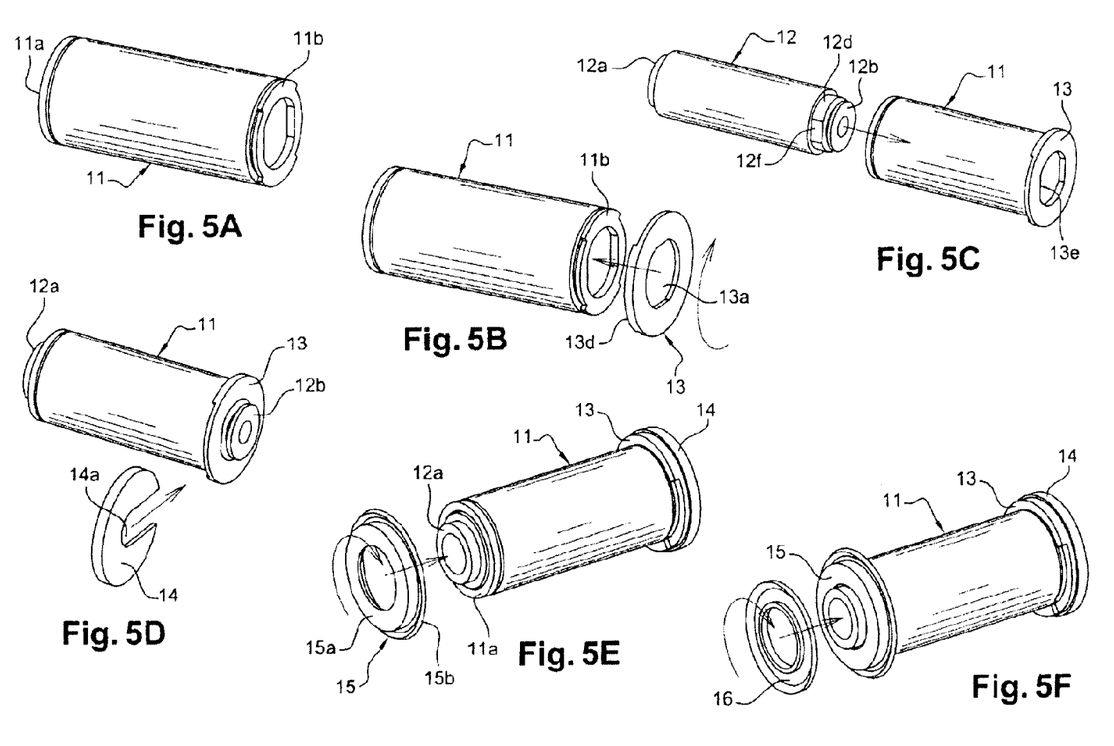
FIGS. 5A to 5F show different steps of assembly of the pin system of the invention.

The different steps of mounting of the system of the invention have been shown in FIGS. 5A to 5F. More precisely, FIG. 5A shows, in a profile view, primary pin 11 with its blind end 11b and its free end 11a.

FIG. 5B shows the step of installation of primary shoulder 13 around blind end 11b of the primary pin: primary shoulder 13 is slipped by the operator along blind end 11b of the primary pin; it is then nested around the said end 11b then turned by an angle of approximately 90° in order to be interlocked around the primary pin.

As shown in FIG. 5C, secondary pin 12 is then inserted into primary pin 11 by sliding from the free face of the said pin. In this way secondary pin 12 is made to slide until undercut relief 12d of the said secondary pin becomes stopped against overhang 11d of primary pin 11. When secondary pin 12 is stopped inside primary pin 11, its flat portion 12f is in contact against flat portion 13e of the primary shoulder and its blind end 12b extends out of primary shoulder 13 via the central orifice of the said shoulder.

This position of the secondary pin, after installation in the primary pin, is shown in FIG. 5D. This FIG. 5D also shows the installation of secondary shoulder 14 around blind end 12b of the secondary pin. This secondary shoulder 14 is mounted by sliding along primary shoulder 13, around groove 12e of the secondary pin.

FIG. 5E shows a profile view of the pin system of the invention opposite the profile shown in FIGS. 5A to 5D. This view of the pin system of the invention shows the secondary pin and the primary pin from their free face. It also shows primary nut 15, which is mounted around free ends 12a and 11a of the secondary and primary pins then screwed around end 11a. Secondary nut 16 is then screwed around this end 12a, as shown in FIG. 5F. When the two nuts 15 and 16 are screwed on, the pin system of the invention is interlocked so that the entire system is blocked in both translation and rotation.

It is evident from these FIGS. 5A to 5F that the great majority of the operations of mounting the system of the invention are performed from the free face of the system, or the external face of the fitting. Only the sliding of the shoulders and a short rotation of the primary shoulder are performed from the blind face of the system, or internal face of the fitting. These operations of sliding and short rotation are actually performed by the operator using his bare hand, or in other words without any tool. Thus, even if the space situated between the fitting and the pyramid arm is too narrow to permit maneuvering of a tool, it is sufficient for the passage of the operator's hand and therefore for mounting of the system of the invention.

Figure 6A:
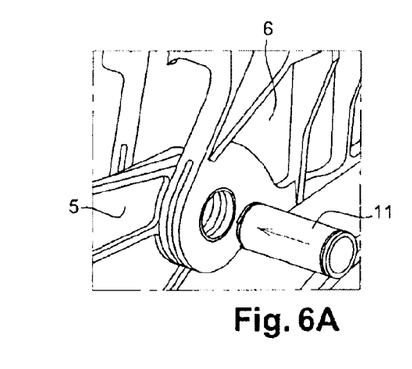
FIGS. 6A to 6F show different steps of mounting of the pin system of the invention in the connection assembly of FIGS. 3A, 3B.

The different steps of installation of the system of the invention in a fitting underneath the wing have been shown in FIGS. 6A to 6F. FIG. 6A shows a perspective view of how primary pin 11 is placed through the orifices of fitting 6 and of fork joint 5, from the maneuvering space situated on the side of the external face of the fitting.

Figure 6B:
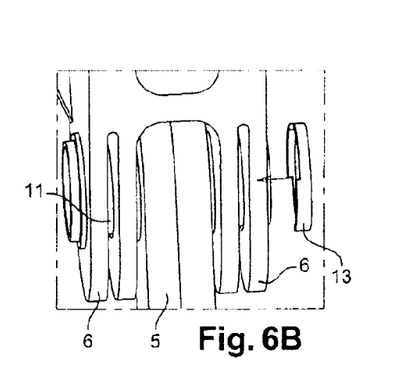

FIG. 6B shows a view from behind the system while primary shoulder 13 is being placed by sliding from the passage space situated between fitting 6 and pyramid arm 4.

Figure 6C:
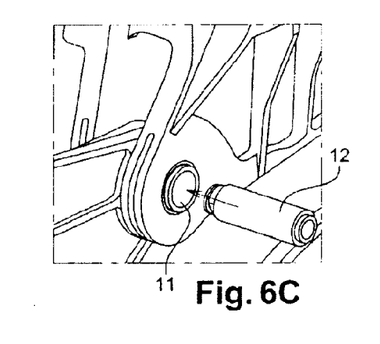
Figure 6D:
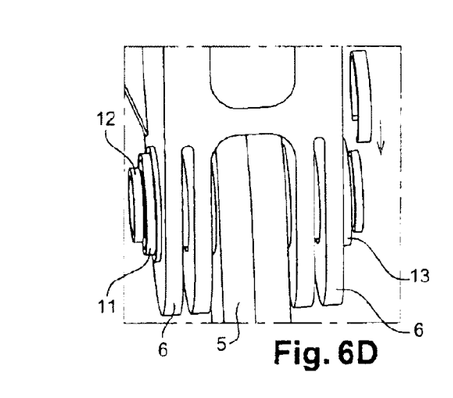

FIG. 6C shows a perspective view of the system of FIG. 6B during insertion of secondary pin 12. FIG. 6D shows a view from behind the system of FIG. 6C while secondary shoulder 14 is being slipped along primary shoulder 13, in the passage space situated between fitting 6 and pyramid arm 4.

Figure 6E:
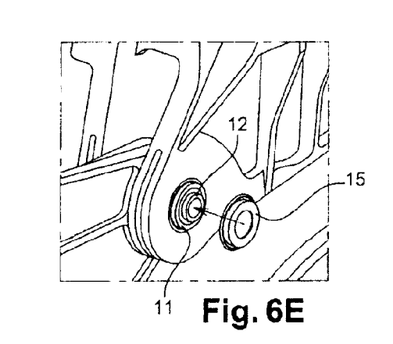
Figure 6F:
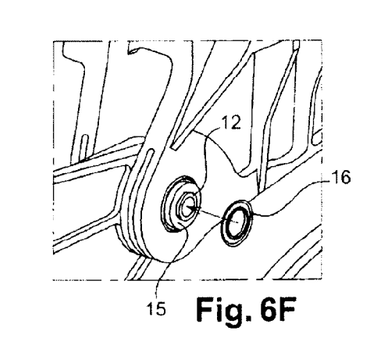

FIG. 6E shows a perspective view of the system of the invention while primary lock 15 is being placed around the free end of the primary and secondary pins. FIG. 6F shows the view of FIG. 6E while secondary lock 16 is being put into place.

Figure 9A:
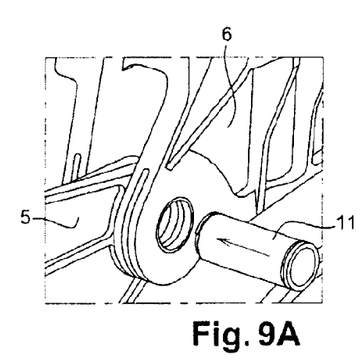
FIGS. 9A to 9F show different steps of mounting of the pin system of FIGS. 8A to 8H in the connection assembly of FIGS. 3A, 3B.

The different steps of installation of the system of the invention according to the embodiment of FIG. 8, in a fitting underneath the wing have been shown in FIGS. 9A to 9F. FIG. 9A shows a perspective view of how primary pin 11 is placed through the orifices of fitting 6 and of fork joint 5, from the maneuvering space situated on the side of the external face of the fitting.

Figure 9B:
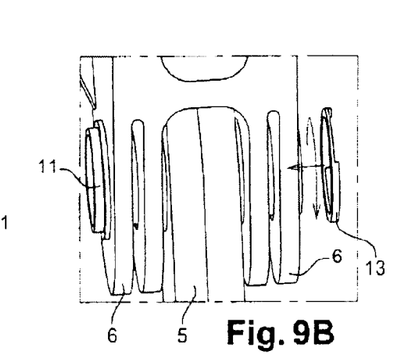

FIG. 9B shows a view from behind the system while primary shoulder 13 is being placed by sliding from the passage space situated between fitting 6 and pyramid arm 4.

Figure 9C:
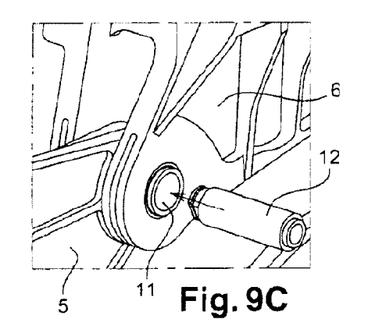
Figure 9D:
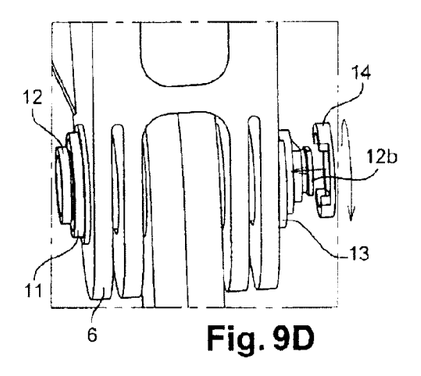

FIG. 9C shows a perspective view of the system of FIG. 9B during insertion of secondary pin 12. FIG. 9D shows a view from behind the system of FIG. 9C while secondary shoulder 14 is being installed around the blind face of the secondary pin, in the passage space situated between fitting 6 and pyramid arm 4, then turned so as to displace the secondary pin toward the external face of the fitting.

Figure 9E:
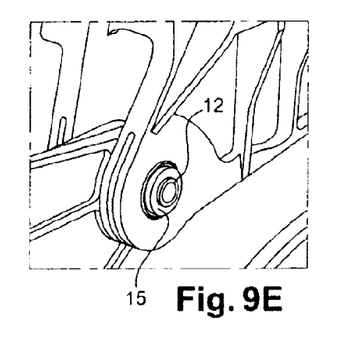
Figure 9F:
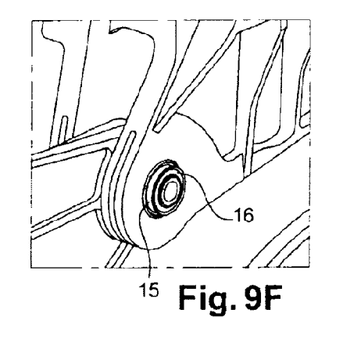

FIG. 9E shows a perspective view of the system of the invention while primary lock 15 is being placed around the free end of the primary and secondary pins. FIG. 9F shows the view of FIG. 9E while secondary lock 16 is being put into place.

Figure 7:
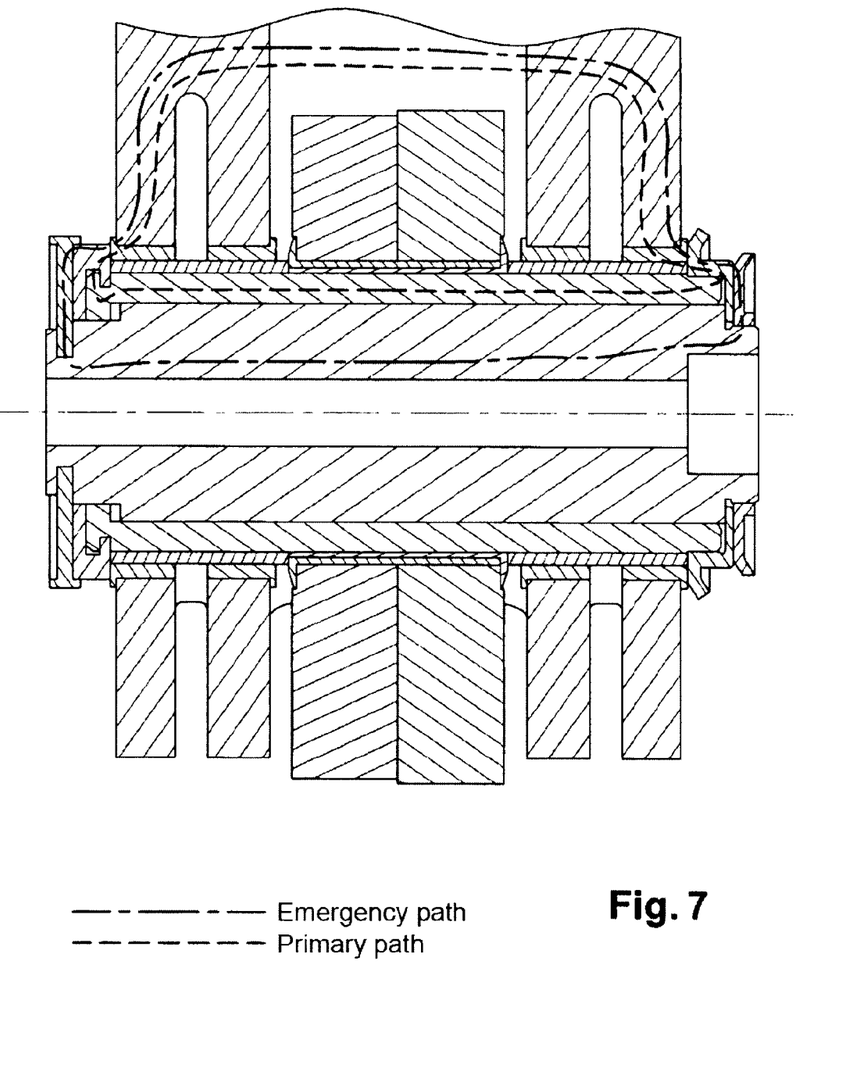
FIG. 7 shows the pin system of FIG. 4 with the primary and emergency paths for passage of forces.

It is understood from the drawings described in the foregoing that the aerodynamic constraint relative to the redundancy of paths for passage of forces is respected by the system of the invention. The primary path for passage of forces in evenly dashed lines and the emergency path for passage in unevenly broken lines have been shown in FIG. 7. In effect, with the system of the invention, the primary path for passage of forces passes through fitting 6, traverses primary shoulder 13 then primary pin 11 over its entire length as well as primary nut 15, then returns toward fitting 6. The emergency path for passage of forces passes through fitting 6, traverses primary shoulder 13 longitudinally, traverses secondary shoulder 14 radially, traverses secondary pin 12 over its entire length then secondary nut 16 and primary nut 15 and returns toward fitting 6. The system of the invention therefore makes it possible to respect the redundancy of passage of forces in the connection structure between engine pylori and wing. In particular, it permits passage of forces via the primary pin of the system.

The invention claimed is:

1. A connection assembly of an engine pylon underneath an aircraft wing, the wing being provided with a fitting, the engine pylon being provided with a fork joint nested in the fitting and fixed to the said fitting by means of a traversing pin system,
   wherein the pin system is provided with:
   an external primary pin,
   a secondary pin mounted inside the primary pin,
   a primary shoulder mounted directly around the primary pin, at a blind end of the pin system, to block the said primary pin in translation,
   a secondary shoulder mounted around one end of the secondary pin, at a blind end of the pin system, to block the system in rotation,
   an interlocking assembly mounted around the primary pin and the secondary pin, at a free end of the pin system, to block the pin system in translation.

2. A connection assembly according to claim 1, wherein the primary shoulder has a flattened annular shape with a central orifice and an external flange capable of being inserted at least partly into a groove of the primary pin.

3. A connection assembly according to any one of claims 1 to 2, wherein the secondary shoulder has a form of a disk equipped with an off-centered oblong lateral opening capable of being inserted around the blind end of the secondary pin.

4. A connection assembly according to claim 1, wherein the primary shoulder has a form of a washer with a central orifice and at least one polarizing element, assuring that the primary shoulder is maintained in a groove of the primary pin.

5. A connection assembly according to claim 1 or 4, wherein the secondary shoulder has a form of a disk equipped with a central opening whose shape is complementary to that of a blind face of the secondary pin.

6. A connection assembly according to any one of claims 1 to 2, wherein the secondary pin is provided with a groove capable of receiving the secondary shoulder.

7. A connection assembly according to any one of claims 1 to 2, wherein the blind end of the secondary pin is provided with at least one flat portion capable of coming into contact against a flat portion of the primary shoulder and/or a flat portion of the primary pin.

8. A connection assembly according to any one of claims 1 to 2, wherein the interlocking assembly is provided with a primary nut screwed around a free end of the secondary pin and a secondary nut mounted around this same one free end of the secondary pin.

9. A method for installing a connection assembly according to claim 1, the method including the following operations:
   installation of the fork joint of the pylon in the wing fitting,
   sliding of the primary pin through the fork joint and the fitting from a free face of the fitting as far as a blind face of the said fitting,
   installation of the primary shoulder around the blind end of the primary pin,
   sliding of the secondary pin inside the primary pin,
   installation of the secondary shoulder around the blind end of the secondary pin,
   screwing of a primary nut around the free end of the secondary pin, and
   installation of a secondary nut around the free end of the secondary pin.

10. An aircraft provided with an engine pylon fixed underneath a wing by way of a connection assembly according to claim 1.

* * * * *